United States Patent [19]

Rodriguez-Perazza

[11] 4,270,907
[45] Jun. 2, 1981

[54] LINK CHAIN FOR POWER DRIVES

[75] Inventor: Manuel Rodriguez-Perazza, Winchester, Mass.

[73] Assignee: GTE Laboratories Incorporated, Waltham, Mass.

[21] Appl. No.: 74,353

[22] Filed: Sep. 10, 1979

[51] Int. Cl.³ ............................................. F16G 13/02
[52] U.S. Cl. .................................... 474/200; 474/155; 474/206
[58] Field of Search ............... 474/200, 155, 164, 206; 59/5, 8, 35, 84; 198/839

[56] References Cited

U.S. PATENT DOCUMENTS

| | | | |
|---|---|---|---|
| 234,444 | 11/1880 | Wexel | 59/28 |
| 325,539 | 9/1885 | Herman | 474/164 |
| 649,091 | 5/1900 | Williams | 59/28 |
| 662,768 | 11/1900 | Crowe | 474/164 |
| 1,442,632 | 1/1923 | DeForest | 274/41.6 R |
| 2,065,788 | 12/1936 | Biedermann | 59/28 |
| 2,101,685 | 12/1937 | Nisbet | 474/164 X |
| 2,190,129 | 2/1940 | Stahl | 59/28 |
| 2,321,702 | 6/1943 | Renkin | 474/164 |
| 3,302,795 | 2/1967 | Jacobs | 210/391 |
| 3,415,135 | 12/1968 | Royer et al. | 474/164 X |
| 3,766,791 | 10/1973 | Huttinger | 474/155 |
| 3,934,407 | 1/1976 | Lange | 59/31 |
| 3,995,506 | 12/1976 | Poe | 474/200 |
| 4,034,556 | 7/1977 | Riber | 59/84 |
| 4,108,014 | 8/1978 | Schreyer et al. | 474/164 X |

Primary Examiner—C. J. Husar
Assistant Examiner—Conrad Berman
Attorney, Agent, or Firm—Fred Fisher

[57] ABSTRACT

An endless standard link chain closed with a quarter- or half-turn twist to increase the contact length by a factor of four or two, respectively, and thus extend its life when used on power drives utilizing sprockets capable of engaging standard link chains.

11 Claims, 3 Drawing Figures

LINK CHAIN FOR POWER DRIVES

BACKGROUND OF THE INVENTION

1. Field of the Invention

This invention relates to link chains for power drives, and, in particular, to a link chain provided with a quarter or half-turn to increase its contact length. Accordingly, it is a general object of this invention to provide new and improved chains of such character.

2. Description of the Prior Art

An endless standard link chain can be driven by a sprocket wheel which causes the links of the chain to rest on surfaces at ninety degrees to the preceding and followings links, such surfaces being at 45° to the plane of the sprocket. Such sprocket wheels are disclosed in the following U.S. Pat. Nos:

325,539—Herman;
662,768—Crowe;
2,101,685—Nisbet;
3,415,135—Royer et al.;
3,766,791—Huttinger;
4,108,014—Schreyer et al.

In U.S. Pat. No. 3,934,407 to Lange, each chain link in succession is alternately rotated about its axis and erected to a vertical position for engagement by upsetting members and welding electrodes.

The following United States Patents all refer to curbing of chains which is performed by twisting individual links, though Williams discusses the twisting of the entire chain:

U.S. Pat. No. 234,444—Wexel
U.S. Pat. No. 649,091—Williams
U.S. Pat. No. 2,065,788—Biedermann
U.S. Pat. No. 2,190,129—Stahl A band with a half twist has been described by August Möbius, a German mathematician, in his Werke, Volume II, 1858. The Möbius strip, or Möbius band, as it is called, is a one-sided surface that can be formed from a rectangular strip by rotating one end 180° and attaching it to the other end (The American Heritage Dictionary of the English Language—1969).

A Möbius strip, being endless, edgeless and one-sided, can be the subject of intellectual discussion (see *Scientific American*, December 1968, pp. 112-115) and can have practical uses. As stated in the *Scientific American* article, Lee De Forest obtained U.S. Pat. No. 1,442,632 for Möbius filmstrip that records sound on both "sides". A similar concept was applied to tape recorders so that the twisted tape runs twice as long as it would otherwise. Several patents have been granted for Möbius strip conveyor belts designed to wear equally on both sides. U.S. Pat. No. 3,302,795 to J. W. Jacobs relates to a self-cleaning filter including an endless belt having a halftwist whereby one surface portion of the belt alternately faces away from a supply housing and toward a backwash housing. U.S. Pat. No. 3,267,406 to Richard L. Davis relates to a Möbius strip non-inductive resistor.

The prior art does not suggest the prolongation of the life of an endless standard link chain by providing it with a quarter-turn or half-turn twist for a chain having an odd number or an even number, respectively, of links. It is to be recognized that alternate links of an eighteen link chain are displaced an average of twenty degrees from each other. Similarly, alternate links of a twenty-five link chain are displaced an average of fifteen degrees from each other. Since intermediate links would be at approximate right angles thereto, it is appreciated that a Möbius "strip" does not simply suggest itself to a three dimensional chain.

SUMMARY OF THE INVENTION

Accordingly, it is another object of this invention to provide a new and improved endless standard link chain closed with a quarter- or half-turn twist to increase its contact length by a factor of four or two, respectively, and thus extend its life when used on power drives utilizing sprockets capable of engaging standard link chains.

In accordance with an embodiment of the invention, an endless standard link chain is closed with an odd number of quarter-turns twist (preferably, one-quarter turn) to increase its contact length by a factor of four. With another embodiment of the invention, an endless standard link chain is closed with an odd number of halves-turn twist (preferably, one-half turn) to increase its contact length by a factor of two. In both cases, their lives are extended when used on power drives utilizing sprockets capable of engaging standard link drives.

In accordance with an embodiment of the invention, an endless link chain is closed with a twist. With other embodiments, an even or an odd number of links are coupled to form an endless standard link chain closed with a half-or quarter-turn twist to increase its contact length by a factor of two or four, respectively. With yet other embodiments, endless link chains can be formed from a standard link chain by rotating one end 90° or 180° and attaching it to its other end.

BRIEF DESCRIPTION OF THE DRAWING

Other objects, advantages, and features of this invention, together with its construction and mode of operation, will become more apparent from the following description, when read in conjunction with the accompanying drawing, in which.

DESCRIPTION OF A PRIOR ART DEVICE

Figure 1:
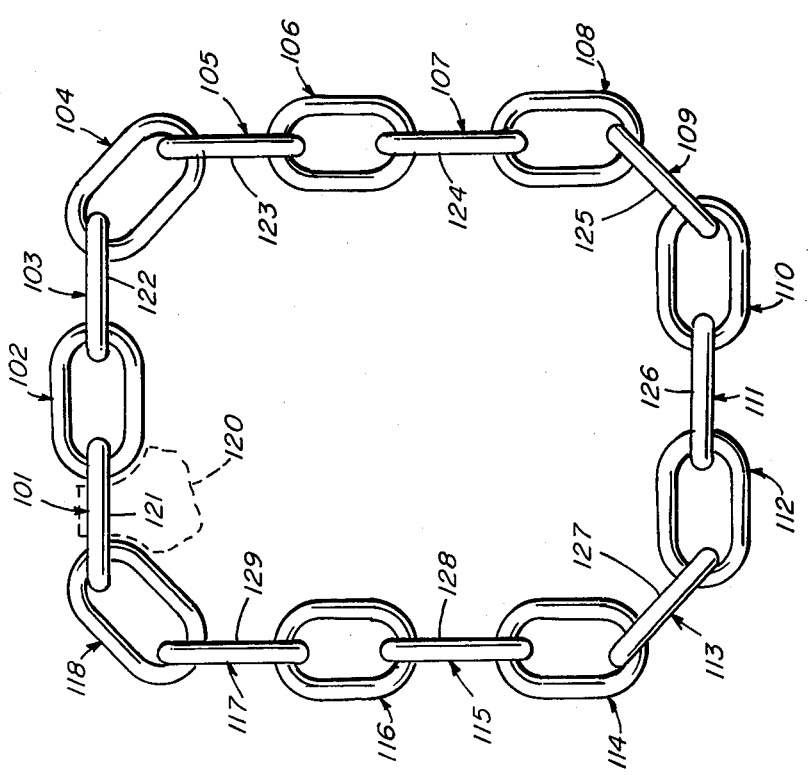
FIG. 1 is a perspective view of an eighteen link endless standard link chain of the prior art, a portion of a sprocket being shown in dotted outline.

Referring to FIG. 1, an endless standard link chain 100 includes eighteen links 101-118, coupled together in a closed loop. Each link 101-118, in general, engages with its adjacent link at approximate right angles to each other. In general, alternate links 101, 103, 105, 107, 109, 111, 113, 115, 117 are formed in loops defining planes which are perpendicular to a common plane. Similarly, the remaining alternate links 102, 104, 106, 108, 110, 112, 114, 116, 118 are formed in loops defining planes which are parallel to the common plane. The chain 100 of FIG. 1 is not twisted. The chain 100 is driven by a sprocket 120, and engages surfaces 121-129 of the links 101, 103, 105, 107, 109, 111, 113, 115, 117, respectively, in repetitive fashion. The opposing surfaces of those links are not engaged by the sprocket 120.

DESCRIPTION OF PREFERRED EMBODIMENTS

Figure 2:
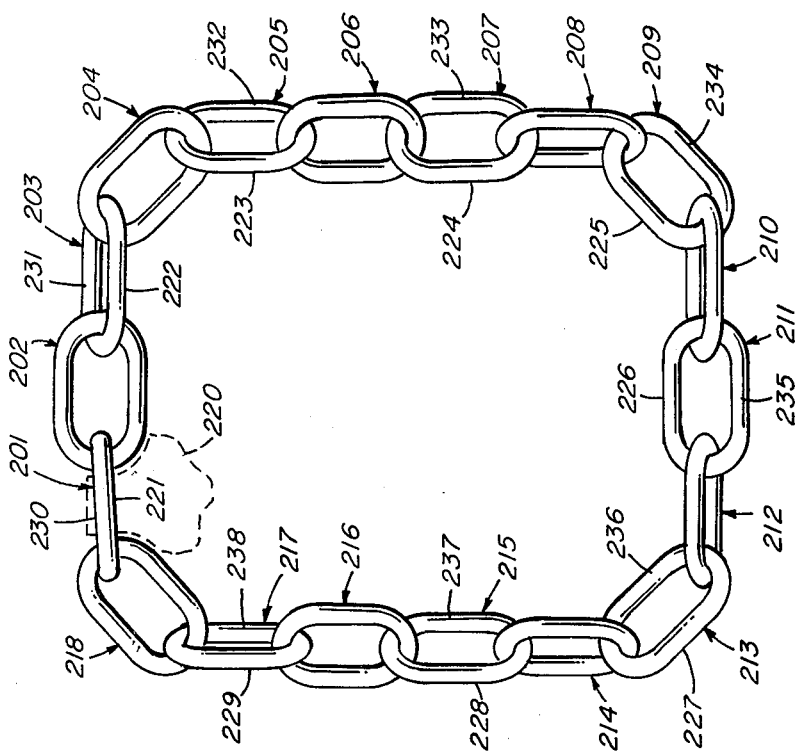
FIG. 2 is a perspective view of an eighteen link endless standard link chain in accordance with one embodiment of this invention.

Referring to FIG. 2, an endless standard link chain 200 includes eighteen links 201–218 coupled together with a half turn twist given to the chain before forming it into a closed loop, thereby giving the endless chain a "Möbius twist." By so doing, nine alternate links 201, 203, 205, 207, 209, 211, 213, 215, 217 are formed in loops defining planes which form angles of +90°, +70°, +50°, +30°, +10°, −10°, −30°, −50°, −70°, respectively, with a common plane. (The sign of the angles are successively given to show the nature of the progressive change). Similarly, the remaining alternate links 202, 204, 206, 208, 210, 312, 214, 216, 218 are formed in loops defining planes which form angles with a common plane differing from one another successively by 20°. The chain 200 of FIG. 2 is twisted by a half turn twist so that a driving sprocket 220 engages first surfaces 221–229 of the links 201, 203, 205, 207, 209, 211, 213, 215, 217, respectively, and then engages opposing surfaces 231–239 of the links 201, 203, 205, 207, 209, 211, 213, 215, 217, respectively, and so on.

Thus, in the foregoing embodiment, an endless link chain 200, closed with a half turn twist, has its contact length increased by a factor of two, thereby extending the life of the chain when used with power drives utilizing a sprocket which engages therewith.

Figure 3:
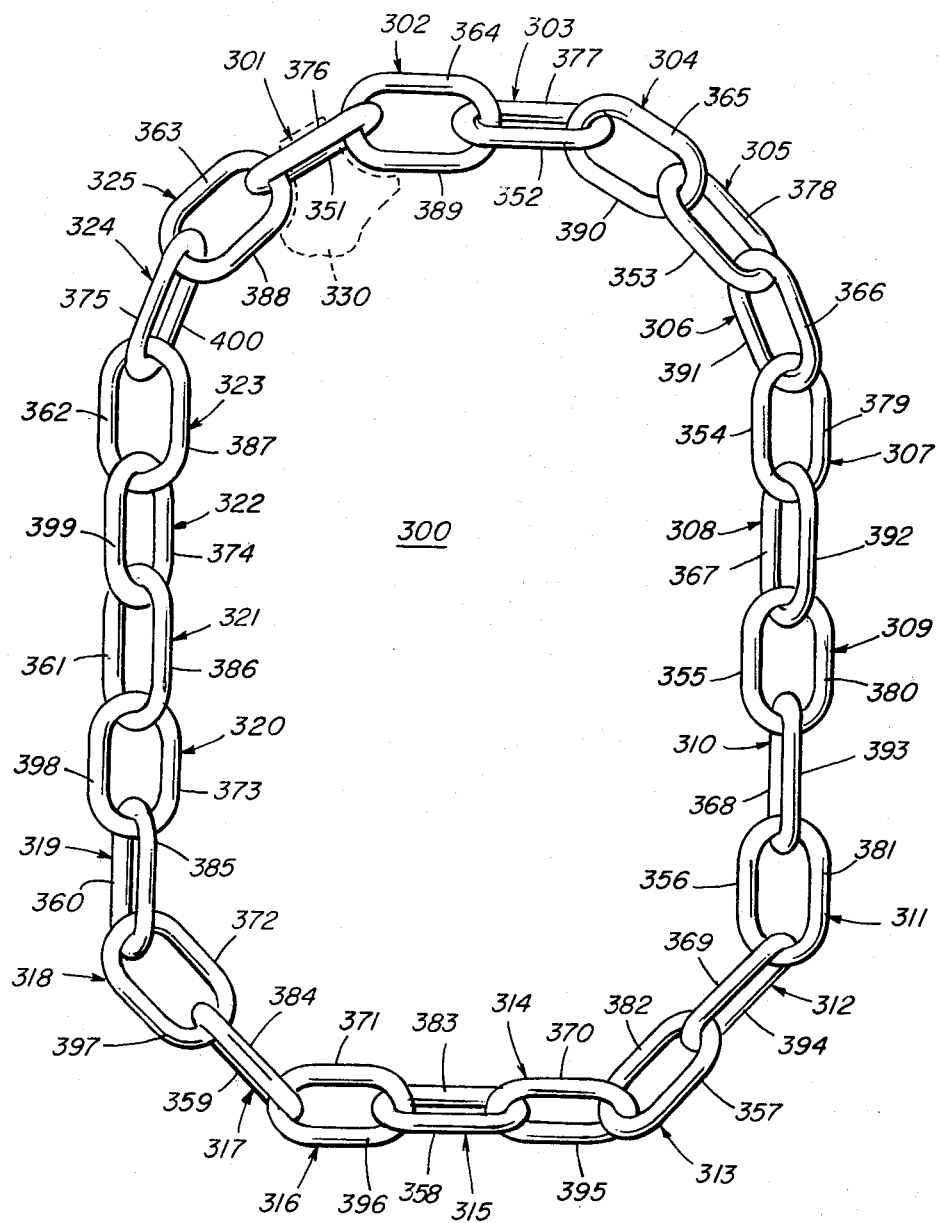
FIG. 3 is a perspective view of a twenty-five link endless standard link chain in accordance with another embodiment of this invention.

Referring to FIG. 3, an endless standard link chain 300 includes twenty-five links 301–325 coupled together with a quarter turn twist given to the chain before forming it into a closed loop, thereby giving the endless chain a quasi-"Möbius twist". By so doing, each link 301–325 engages its adjacent link at an average angle of $(90-90°/25)$ or 86.4 degrees. The chain 300 of FIG. 3, being twisted with a quarter turn twist, is driven by a sprocket 330 which engages first surfaces 351–375 of links 301, 303, 305, 307, 309, 311, 313, 315, 317, 319, 321, 323, 325, 302 304, 306, 308, 310, 312, 314, 316, 318, 320, 322, 324, respectively, and then engages opposed surfaces 376–400 of the links 301, 303, 305, 307, 309, 311, 313, 315, 317, 319, 321, 323, 325, 302, 304, 306, 308, 310, 312, 314, 316, 318, 320, 322, 324, respectively, and so on.

Thus, in the latter embodiment, an endless link chain 300, closed with a quarter turn twist, has its contact length increased by a factor of four, thereby extending the life of the chain when used with power drives utilizing a sprocket which engages therewith.

In essence, as shown by the embodiment of FIG. 2, an even number of links in a chain can be given a half twist prior to forming same in a closed loop, thereby increasing the contact length by a factor of two. Alternatively, an odd number of links can be added to an even number of links in a chain (i.e., add one to twenty-four) and given a quarter-turn twist prior to assemblying same in a closed loop, thereby increasing the contact length by a factor of four.

Other modifications may be performed without departing from the spirit and scope of this invention. The embodiment of FIG. 2 can be formed with an odd number of half-twists; the embodiment of FIG. 3 can be formed with an odd number of quarter-turns twists. The links, alternatively, can be turned in the opposite direction from that depicted in the drawing without departing from the spirit of the invention. Other modifications will suggest themselves to those skilled in the art.

What is claimed is:

1. A power drive including sprockets capable of engaging a standard link chain, and an endless standard link chain closed with a quarter-turn twist to increase its contact length by a factor of four, and thus extend its life when used on said power drive utilizing said sprockets.

2. A power drive including sprockets capable of engaging a standard link chain, and an endless standard link chain closed with n quarters-turn twist to increase its contact length by a factor of four, and thus extend its life when used on said power drive utilizing said sprockets, wherein n is an odd integer.

3. The link chain as recited in claim 2 wherein n is 1.

4. A power drive including sprockets capable of engaging a standard link chain, and an endless standard link chain closed with a half-turn twist to increase its contact length by a factor of two, and thus extend its life when used on said power drive utilizing said sprockets.

5. A power drive including sprockets capable of engaging standard link chains, and an endless standard link chain closed with n halves-turn twist to increase its contact length by a factor of two, and thus extend its life when used on said power drive utilizing said sprockets, wherein n is an odd integer.

6. The link chain as recited in claim 5 wherein n is 1.

7. A power drive including sprockets capable of engaging link chains, and an endless link chain closed with a twist to increase its contact length, and thus extend its life when used on said power drive utilizing said sprockets.

8. A power drive including sprockets capable of engaging standard link chains, and an even number of links coupled to form an endless standard link chain closed with a half-turn twist to increase its contact length by a factor of two, and thus extend its life when used on said power drive utilizing said sprockets, wherein said number is greater than 2.

9. A power drive including sprockets capable of engaging standard link chains, and an odd number of links coupled to form an endless standard link chain closed with a quarter-turn twist to increase its contact length by a factor of four, and thus extend its life when used on said power drive utilizing said sprockets, wherein said number is greater than 3.

10. A combination comprising an endless standard link chain formed from a standard link chain by rotating one end 180° and attaching it to its other end, and a sprocket for engaging said chain and thus extend the life of the chain when used on a power drive utilizing said sprocket.

11. A combination comprising an endless standard link chain formed from a standard link chain by rotating one end 90° and attaching it to its other end, and a sprocket for engaging said chain and thus extend the life of the chain when used on a power drive utilizing said sprocket.

* * * * *